United States Patent
Tootoonchian

(10) Patent No.: US 10,402,388 B1
(45) Date of Patent: Sep. 3, 2019

(54) PARTITION-BASED ANALYTIC SYSTEMS AND METHODS

(71) Applicant: Levyx, Inc., Irvine, CA (US)

(72) Inventor: Ali Tootoonchian, Irvine, CA (US)

(73) Assignee: Levyx, Inc., Irvine, CA (US)

( * ) Notice: Subject to any disclaimer, the term of this patent is extended or adjusted under 35 U.S.C. 154(b) by 312 days.

(21) Appl. No.: 15/420,610

(22) Filed: Jan. 31, 2017

(51) Int. Cl.
  *G06F 17/30* (2006.01)
  *G06F 16/22* (2019.01)
  *G06F 16/2455* (2019.01)
  *G06F 16/2453* (2019.01)

(52) U.S. Cl.
  CPC ...... *G06F 16/2282* (2019.01); *G06F 16/2455* (2019.01); *G06F 16/24535* (2019.01)

(58) Field of Classification Search
  CPC .................................................. G06F 16/2282
  See application file for complete search history.

(56) References Cited

U.S. PATENT DOCUMENTS

| | | | |
|---|---|---|---|
| 4,811,207 A | 5/1989 | Hikita et al. | |
| 5,625,818 A * | 4/1997 | Zarmer | G06F 16/958 |
| 5,842,207 A | 11/1998 | Fujiwara et al. | |
| 6,330,008 B1 * | 12/2001 | Razdow | G06F 11/3404 |
| | | | 709/230 |
| 6,525,737 B1 * | 2/2003 | Duluk, Jr. | G06T 1/60 |
| | | | 345/502 |
| 6,968,335 B2 | 11/2005 | Bayliss et al. | |
| 8,473,483 B2 | 6/2013 | Teletia et al. | |
| 8,959,094 B2 | 2/2015 | Taylor | |
| 9,880,933 B1 * | 1/2018 | Gupta | G06F 12/0815 |
| 2004/0133540 A1 * | 7/2004 | Saake | G06F 16/113 |
| 2008/0235228 A1 * | 9/2008 | Kent | G06F 7/24 |
| 2009/0063393 A1 * | 3/2009 | Saake | G06F 16/113 |
| 2010/0082774 A1 * | 4/2010 | Pitts | H04N 21/222 |
| | | | 709/219 |
| 2010/0122065 A1 * | 5/2010 | Dean | G06F 9/4881 |
| | | | 712/203 |
| 2011/0040810 A1 * | 2/2011 | Kaplan | G06F 16/11 |
| | | | 707/822 |
| 2012/0191699 A1 * | 7/2012 | George | G06F 16/24554 |
| | | | 707/718 |
| 2014/0032525 A1 * | 1/2014 | Merriman | G06F 16/244 |
| | | | 707/713 |
| 2014/0214799 A1 * | 7/2014 | Li | G06F 16/24532 |
| | | | 707/718 |
| 2014/0324890 A1 * | 10/2014 | Caufield | G06F 7/24 |
| | | | 707/752 |
| 2016/0321294 A1 * | 11/2016 | Wang | G06F 16/182 |

\* cited by examiner

*Primary Examiner* — Syed H Hasan

(74) *Attorney, Agent, or Firm* — Fish IP Law, LLP

(57) ABSTRACT

A persistent distributed database system is disclosed that partitions a database structure into a plurality of partitions to optimize repeated analytics that are executed on the database structure. A repeated analytic is partitioned into sub-analytics that are executed on the database partitions, and upon repeated executions, sub-analytics are only repeated upon database partitions that have been updated since the previous execution. This drastically reduces the time to repeat execution of a repeated analytic, and frees up resources that could be better spent on other processes.

13 Claims, 5 Drawing Sheets

PARTITION-BASED ANALYTIC SYSTEMS AND METHODS

FIELD OF THE INVENTION

The field of the invention is data analytic systems.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As storage databases grow to ever-increasing sizes, processing and analyzing such data consumes ever-more system resources, such as processor-time, storage, and bandwidth. Reducing the processing time to perform data analysis even by a few milliseconds can mean the difference between a superior and an inferior product, particularly when data is processed a few billion times per day among a large set of clustered nodes. Database analytics, in particular, consume a large amount of computer resources, particularly when performing multiple analytics upon databases greater than a terabyte.

U.S. Pat. No. 5,842,207 to Fujiwara teaches a sorting method used with a distributed database whose key values is divided into a plurality of sections, which are then assigned to a plurality of processors. Fujiwara's system sorts key values independently of one another. The sorting results are distributively stored in the plurality of processors, and only the information that represents the correspondence between the sections of the key values is transferred to the host processor—eliminating the need for carrying out the merge processing in the host processor. Fujiwara's system, however, needs to repartition and resort the distributed database after every update of the database records.

U.S. Pat. No. 8,959,094 to Taylor teaches a database machine with specialized hardware that accelerates the sort function. Taylor's system provides for an early return of a number of results, which is useful because often an entire result set is not required. For example, for systems that only require the first L results, the system could be configured to return the first K results, where L⇐K. Taylor's system, however, fails to provide ways to accurately identify which L results are the important, pertinent result-sets needed.

Thus, there remains a need for a system and method that improves performing multiple analytics upon large databases.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods in which a computer system repeatedly executes an analytic on an electronic database structure in an efficient manner. The system partitions the database structure into a plurality of database partitions, and also partitions the analytic into a plurality of sub-analytics that are applied to each of the database partitions. Each sub-analytic executed on a database partition created a sub-result, which are each combined with one another to generate a final result. When the database is updated, only some of the database partitions are updated, and so when the analytic is re-executed upon the database structure, only some of the database partitions need to have the analytic executed upon it. In this manner, repeating analytics can be performed with great efficiency.

The computer system generally partitions the database structure as a function of the analytic. For example, a SORT database command generally sorts the database structure in accordance with some sort of alphabet, such as a numeric alphabet, a Greek alphabet, a symbolic alphabet, or an alphanumeric alphabet. In such an embodiment, the computer system could assign one section of the alphabet to one partition and assign another section of the alphabet to another partition. A JOIN, AGGREGATE, or GROUP BY database command could divide the database structure using a hash table or some other algorithm that splits a database partition into substantially equal segments.

As used herein, a "substantially equal segment" comprises two segments that contain approximately the same number of data elements to within a 90%, 95% or even within a 99% ratio. The computer system could be programmed to periodically repartition the database structure to maintain the ratios of one partition with another. In some embodiments, the system may be programmed to first perform the analytic on the database structure and then partition the database structure, so as to ensure that the database partitions are evenly divided. Such a step is particularly important where the analytic comprises a SORT command, which requires the database structure to be sorted in accordance with an alphabet order.

Each database partition is saved on a portion of memory and is assigned a dirty flag. The dirty flag is initially reset upon initialization or upon execution of a sub-analytic on the database partition. The dirty flags for a database partition could be saved in a hashmap for quick access, which is particularly useful for database partitions containing a large number of partitions (e.g. over 100 or over 1000 partitions). When the database structure is updated, the database partition that corresponds with that section of the database structure is also updated, and the dirty flag for that database partition is set. Later, when the analytic is re-run on the database structure, only the database partitions with a set dirty flag need have the sub-analytic run on them. The database structures with a reset dirty flag need not have the sub-analytic run. Once the sub-analytic is run on the database structure, the corresponding dirty flag could then be reset.

The memory could also have a section for sub-results to be saved. In situations where the analytic comprises only a SORT command, the sub-result could be saved over the database partition, which will also decrease the amount of time it takes to perform a recurring SORT sub-analytic. When recurring analytics are performed upon the database, only sub-results that correspond with a database partition with a set dirty flag need be overwritten. Sub-results that correspond with database partitions with a reset dirty flag need not be overwritten.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Computer devices that are "functionally coupled to" one another are coupled to one another through a wired or wireless electronic connection that allows the devices to communicate data with one another.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One should appreciate that the disclosed techniques provide many advantageous technical effects including the ability to repeatedly execute a data analytic upon a database structure by applying the analytic only to portions of the database structure that have been updated.

Figure 1:
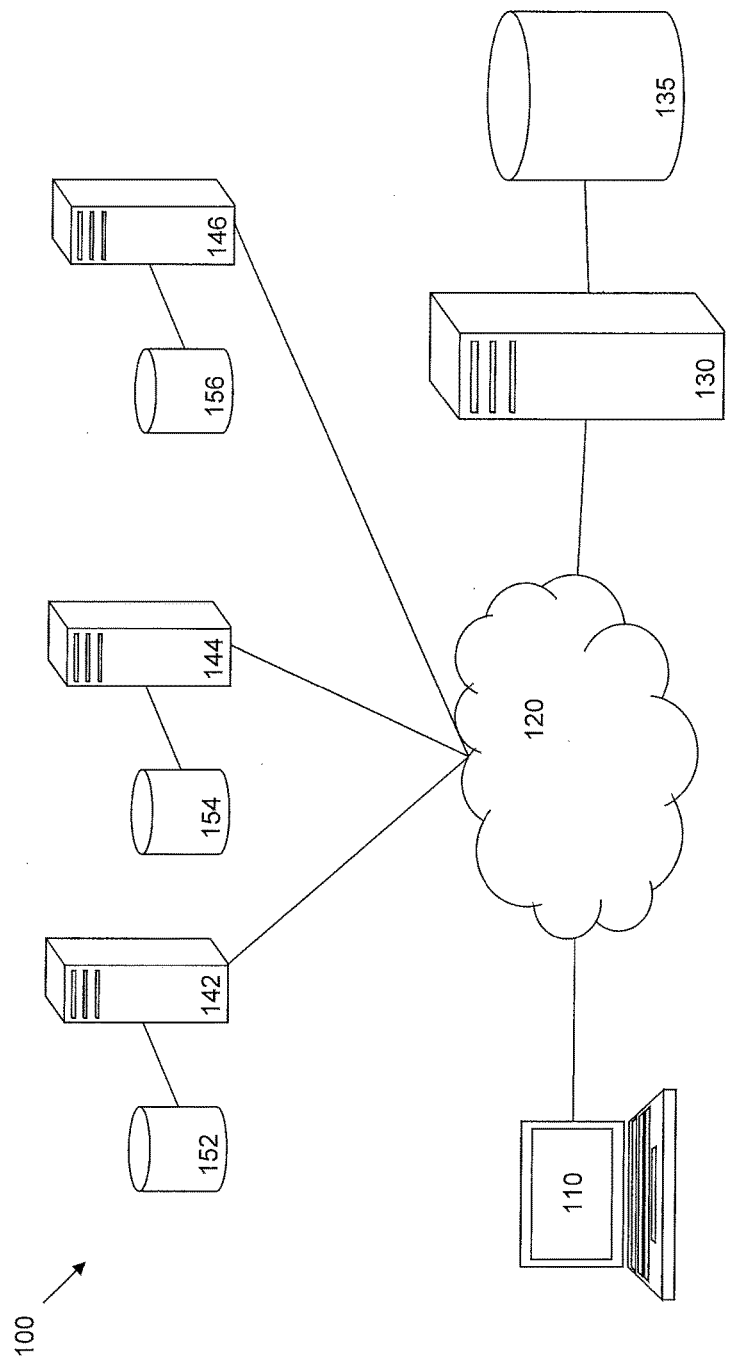
FIG. 1 shows a hardware schematic of an exemplary repeating analytic system.

In FIG. 1, an exemplary system 100 shows a user interface 110 accessing a remote database system 130 via network 120. While user interface 110 is shown as a single computer system, it should be noted that language directed to a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Computer software that is "programmed" with instructions is developed, compiled, and saved to a computer-readable non-transitory medium specifically to accomplish the tasks and functions set forth by the disclosure when executed by a computer processor.

Network 120 could be any hub that is used to communicate data from one computer system to another computer system, such as a packet-switched network, the Internet, LAN, WAN, VPN, or other suitable data hub. User interface 110 accesses database system 130 housing database 135. User interface 110 sends commands to database system 130 to execute upon database structure 135, such as INSERT, DELETE, UPDATE, SORT, JOIN, AGGREGATE, GROUP BY, ORDER BY, SUM, COUNT, MIN, MAX, or AVG. Certain analytics could be designated as repeating analytics that comprise time-consuming analytics that necessitate segmentation in order to improve efficiency. In some embodiments, an administrative user could designate an analytic as a repeating analytic through user interface 110, while in other embodiments a computer system, such as database system 130, could be programmed to analyze analytics performed on database structure 135 and determine that an analytic is a repeating analytic when it is run a threshold number of times on the same portion of the database structure and the analytic's runtime is over a threshold number.

The system partitions the repeating analytics into sub-analytics so they can be run on partitions of the database structure. The system partitions the portion of the data structure that the repeating analytic affects. In the exemplary system 100, the system splits the portion of the database structure into three portions—partition 152 accessed on computer system 142, partition 154 accessed on computer system 144, and partition 156 accessed on computer system 146. When a command to update database structure 135 is sent to database system 130, database system 130 sends a command to the computer system that controls the corresponding database partition that houses a copy of that section of database structure 135 and sets the dirty flag of that database partition. When a command to execute the repeating analytic is sent to database system 130, database system 130 sends a command only to which one of computer systems 142, 144, and 146 to execute sub-analytics on data partitions having a dirty flag set.

While exemplary system 100 shows the system distributed among 5 computer systems, more or less computer systems could be used. For example a distributed system could distribute database partitions among hundreds or even thousands of storage units in a network. In other embodiments, the database structure upon which the repeating analytics are run and the database partitions upon which the sub-analytics are run could be saved on the same storage unit. In some embodiments, a cloud system could have logical storage units and logical processing units available to a system that assigns data partitions to logical storage units to house the partitions and logical processing units to execute the sub-analytics. It should be apparent to those skilled in the art that many more modifications besides those already described are possible.

Figure 2:
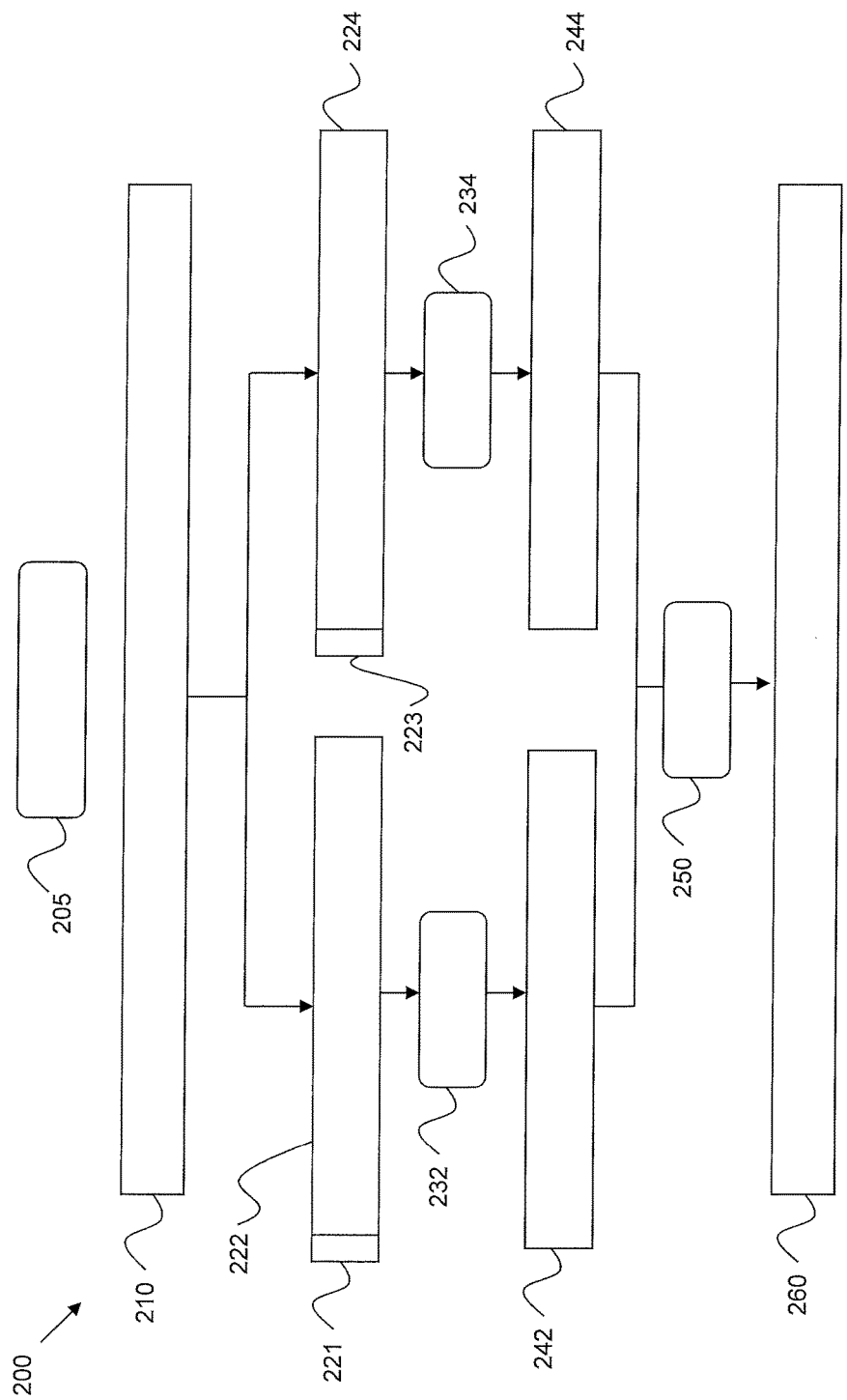
FIG. 2 shows a software schematic of various states of a database structure while an analytic executes.

In FIG. 2, a schematic 200 shows a database structure 210 upon which a repeating analytic 205 is run. The system splits database structure 210 into two partitions, partition 222 and partition 224. Each partition has a dirty bit assigned to the partition. Partition 222 has dirty bit 221, and partition 224 has dirty bit 223. A dirty bit is a boolean value that reveals whether or not that database partition has been updated. A reset bit (0) represents that database partition has not been updated. A set bit (1) represents that the database partition has been updated. The system also splits repeating analytic 205 into sub-analytic 232 and sub-analytic 234.

Any suitable manner of partitioning database structure 210 and repeating analytic 205 could be used. For example, where the repeating analytic 205 is a SORT command, database structure 210 could first be sorted, and then could be split into substantially equal portions (2, 5, 10, 1000, or more partitions depending upon a system setting). The SORT analytic could then be applied to each partition. Where the repeating analytic is a JOIN command, each of the database structures could be partitioned using a hashmap that splits the database structures into substantially equal portions using the JOIN key. By using a key of the command as the input to the hash function, the system ensures that correlating sections of each database structure to be joined will be matched with one another. The JOIN analytic could then be applied to each partition.

In some embodiments, the system will have a template that automatically partitions the database structure and the analytic in accordance with an algorithm, such as those mentioned above. Contemplated templates include nested command structures, such as a template for a JOIN (SORT (X), AGGREGATE (Y, Z)) template that creates a repeating analytic for SORT (X), a repeating analytic for AGGREGATE (Y, Z), and a repeating analytic for joining both of those results. In other embodiments, the system will allow an administrator user to manually partition the database structure and the repeating analytic. Guidance from an administrator user is particularly important when the repeating analytic is a complex analytic with several nested commands for which a template is not available.

Executing sub-analytic 232 on database partition 222 results in database sub-result 232 and executing sub-analytic 234 on database partition 224 results in database sub-result 244. Once a sub-analytic has been executed on a database partition to create a sub-result, the dirty bit is reset. Once a database partition has been updated, the dirty bit is set. As used herein, a database partition that has been updated has been altered, for example by changing the value of an entry, by adding an entry, or by deleting an entry.

Executing sub-analytic 250 combines sub-result 242 with sub-result 244 to create result 260. Any suitable manner of combining two sub-results is contemplated. In some embodiments, sub-analytic 250 copies the contents of sub-result 242 and sub-result 244 into a new memory location reserved for result 260. In other embodiments, sub-analytic 250 could simply insert a pointer that links sub-result 242 to sub-result 244, for example at the end of sub-result 242. In such an embodiment, result 260 need not be saved to a separate memory location and may be read from directly.

While schematic 200 shows only a single database structure upon which a repeating analytic is run, this system could be implemented using a plurality of database structures. For example, where the repeating analytic comprises a JOIN or AGGREGATE database command, the repeating analytic, and repeating sub-analytic, would be executed upon a plurality of database structures and database partitions.

Figure 3:
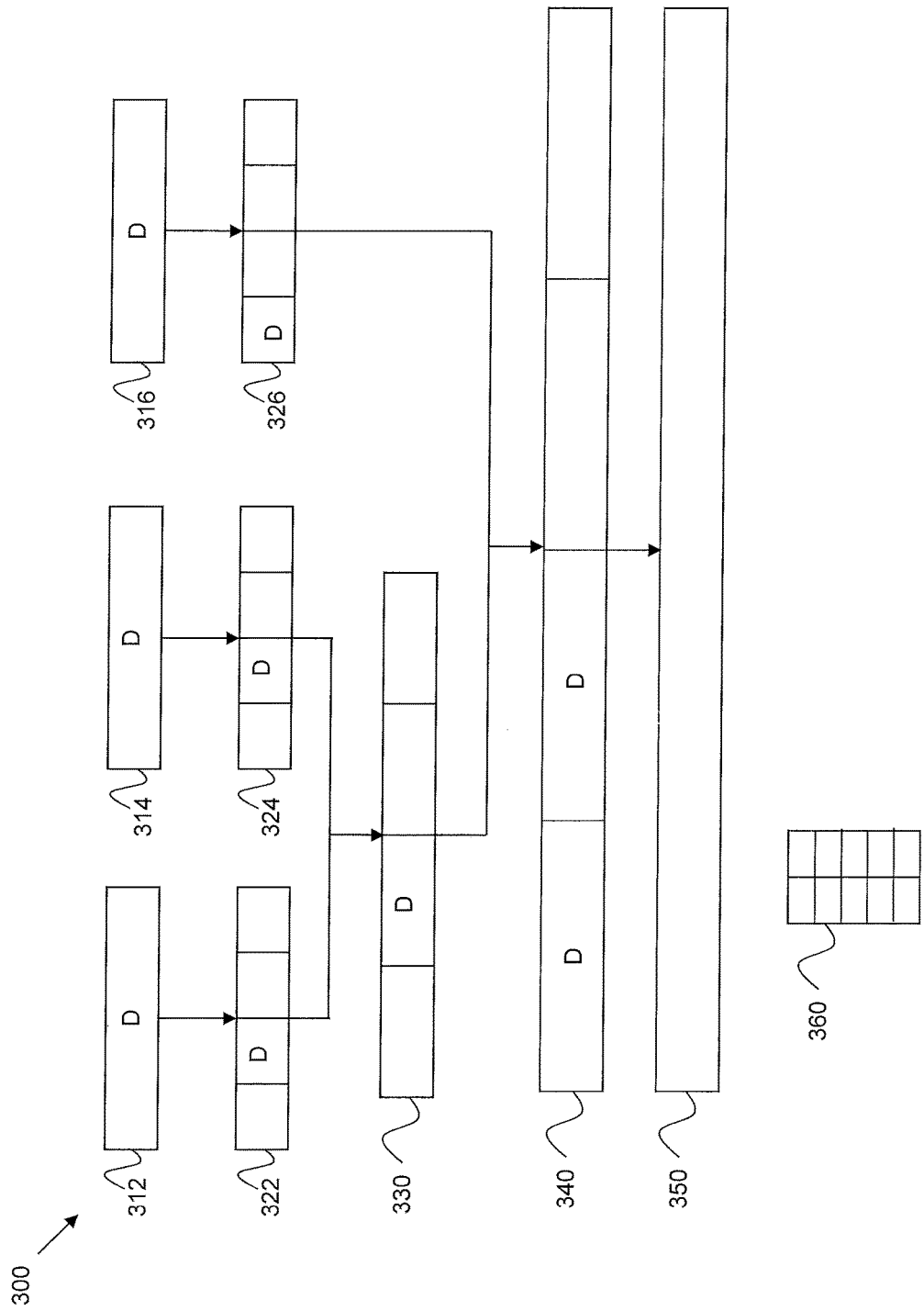
FIG. 3 shows a software schematic of alternative states of a database structure while an analytic executes.

FIG. 3 shows an exemplary schematic 300 showing memory locations for different portions of the process. Memory locations 312, 314, and 316 reference the memory locations for three database structures that are having repeatable analytics performed upon them, such as a JOIN or AGGREGATE database command. Memory location 322 represents the memory location for four partitions of database structure 312. In the current embodiment, memory location 322 is a separate memory location that acts as a replica of the database structure saved in memory location 312, however the system could be programmed to partition the database structure in memory location 312 (or move the database structure from a physically or logically contiguous memory location to a physically or logically partitioned memory location) without needing to replicate the database structure in two separate memory locations. Likewise, memory location 324 is a partitioned replica of database structure 314, and database structure 326 is a partitioned replica of database structure 316. While each of memory locations 322, 324, and 326 are shown as a single memory location having four partitions, the partitions could be distributed among four different computer systems allowing a separate processor to be dedicated towards each partition. In preferred embodiments, the partitions are distributed among a cloud storage system that can dynamically allocate processing power towards a partition when a sub-analytic needs to be run on a partition.

Memory location 330 represents the memory location of a sub-result where a sub-analytic has been run on the database partitions of memory location 322 and of memory location 324. The sub-analytic is run on the first partition of memory location 322 and the first partition of memory location 324, resulting in the first partition of memory location 330. The sub-analytic is run on the second partition of memory location 322 and the second partition of memory location 324, resulting in the second partition of memory location 330. The sub-analytic is run on the third partition of memory location 322 and the third partition of memory location 324, resulting in the third partition of memory location 330. The sub-analytic was is on the fourth partition of memory location 322 and the fourth partition of memory location 324, resulting in the fourth partition of memory location 330.

Memory location 340 holds a partitioned result of the repeating analytic, which is generated by executing a sub-analytic on the partitions of the sub-result saved in memory location 330 and the partitions of memory location 326. The sub-analytic is run on the first partition of memory location 330 and the first partition of memory location 326, resulting in the first partition of memory location 340. The sub-analytic is run on the second partition of memory location 330 and the second partition of memory location 326, resulting in the second partition of memory location 340. The sub-analytic is run on the third partition of memory location 330 and the third partition of memory location 326, resulting in the third partition of memory location 340. The sub-analytic is run on the fourth partition of memory location 330 and the fourth partition of memory location 326, resulting in the fourth partition of memory location 340. In total, sub-analytics are executed eight times to produce the partitioned result saved in memory location 340.

Memory location 350 holds a copy of an unpartitioned result of the repeating analytic. In some embodiments, depending upon how memory location 340 is partitioned, it may be preferred to provide the result on an unpartitioned portion of memory. In other embodiments, it may be preferable to provide a query engine access to memory location 340 once the analytic has been executed.

Memory location 360 holds a table of the memory address (virtual or physical) of each of the partitions, along with a dirty bit associated with that partition. When a sub-analytic has been executed on that partition, the dirty bit associated with that partition is reset. When at least a portion of the database partition has been updated in some manner (e.g. insert, change value, delete), the dirty bit associated with that partition is set. Preferably, the table stored in memory location 350 comprises a hash table, which allows for quick access to a database partition and dirty bit in embodiments with a large number of partitions, for example over 100 or 1000 partitions.

From time to time, the databases saved in memory locations 312, 314, and 316 are updated. If this occurred with prior art databases, the system would need to execute the analytic upon the entirety of the databases saved in memory locations 312, 314, and 316.

However, an analysis of the databases reveals that only a portion of each of the databases was updated. Here, only the second partition of the database saved in memory location 322 was updated, only the second partition of the database saved in memory location 324 was updated, and only the first memory partition of the database saved in memory location 326 was updated. Preferably, the system sets the dirty flag associated with that partition when the data correlating with that section of the partition is updated.

The next time the system receives a command to execute the repeating query, the system need only execute three sub-analytics: (1) a sub-analytic upon the second partition of the database saved in memory location 322 and the second partition of the database saved in memory location 324, (2) a sub-analytic upon the first partition of the database saved in memory location 330 and the first partition of the database saved in memory location 326, and (3) a sub-analytic upon the second partition the database saved in memory location 330 and the second partition the database saved in memory location 326.

In some embodiments, the same partition could be used with a plurality of analytics. A template library could receive a plurality of repeating analytics and could select two or more repeating analytics that could share the same database partitions while having different sub-analytics executed upon the database partitions. For example, an admin user could submit two repeating analytics that are commonly executed within the same time period (over a minimum threshold of common executions), which could trigger such an association. In such embodiments, the first layer of database partitioned, shown in schematic 300 saved in memory locations 322, 324, and 326 would be shared among the repeating analytic, but the next layers, shown saved in memory locations 330 and 340, would be discrete between the repeating analytics. In such embodiments, when the system receives a request for one of the repeating analytics to be executed, all repeating analytics that share the same database partitions could also be executed, so that the dirty flags could be synchronized. In alternative embodiments, each repeating analytic could have its own set of dirty flags.

Figures 4, 5:
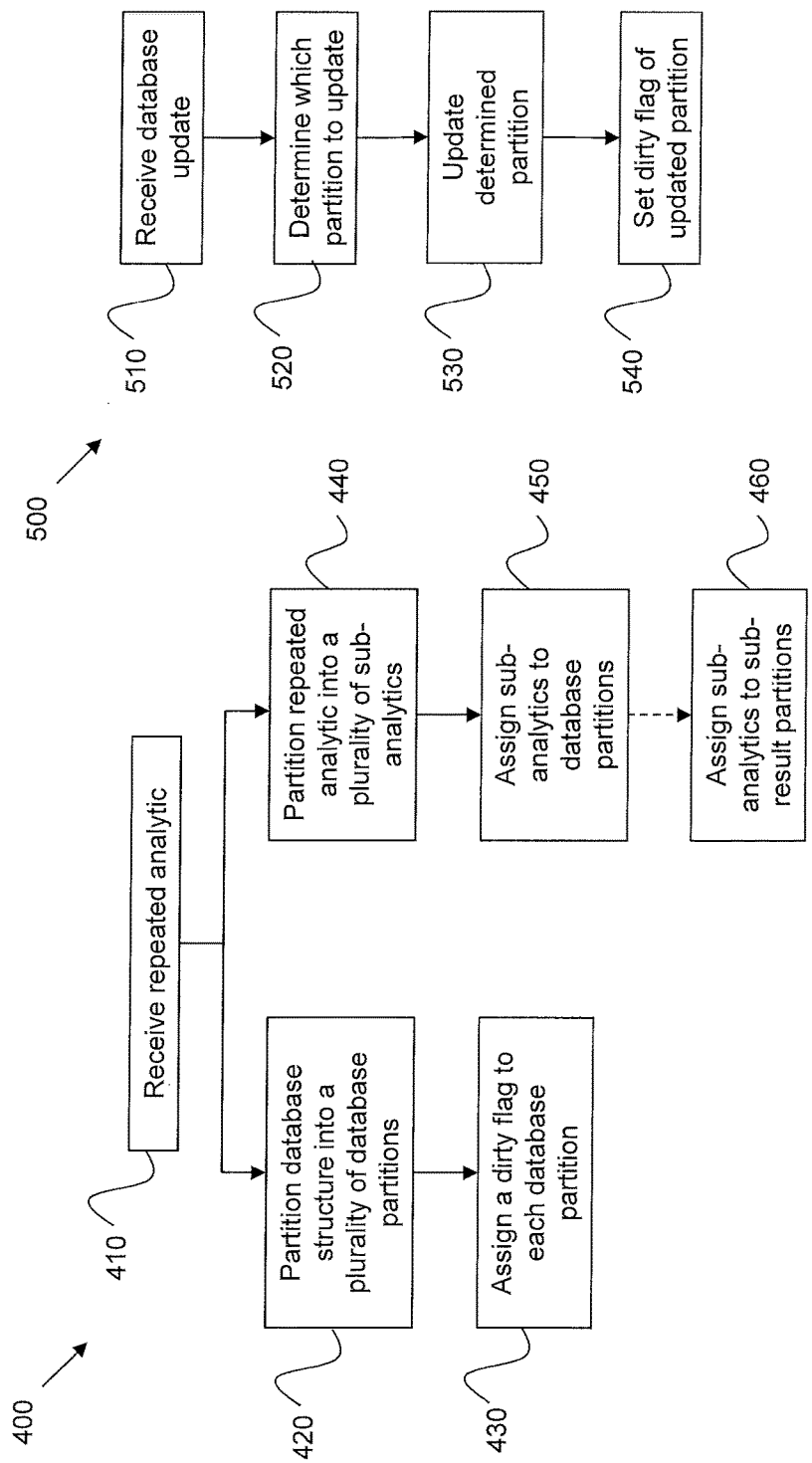
FIG. 4 shows a method of partitioning a database structure a repeating analytic.
FIG. 5 shows a method of updating the database structure.

FIG. 4 shows an exemplary method that could be used to initialize a system built to execute the repeating analytic. In step 410, the system receives the repeating analytic. In some embodiments this could be performed manually, by an administrator user identifying an analytic as a repeating analytic, or could be performed automatically by the system that tracks how many times an analytic is performed on common database structure(s) within a threshold amount of time, and if the number exceeds a given threshold, the system could automatically flag the analytic as a repeating analytic that requires a system generated to repeatedly execute the analytic in a more efficient manner.

The system then partitions the database structure into a plurality of database partitions. The number of partitions could be determined by a variety of factors, for example the size of the database structure affected by the analytic (e.g. one partition for every 200 MB of data affected by the analytic) or the time it takes to complete the analytic on an unpartitioned database structure (e.g. one partition for every 20 seconds). The partitions are preferably divided in such a way that the partitions are of substantially equal size to one another. (within 1% or 5% of another's size) In some embodiments, the system could be programmed to periodically compare the size of each partition against one another, and when the size difference between the smallest partition and largest partition exceeds a threshold number, the system could automatically resize the partitions or create new partitions and copy the data from the old partitions to the new, more equal partitions. In some embodiments, the system generates the partitions by simply placing database entries sequentially or randomly into allocated database partitions, and in other embodiments the system could generate the partitions by feeding database key entries into a hash table built to produce substantially equal partitions.

In step 430, each partition is assigned a dirty flag, preferably using a hash table. Each partition of at least some of the sub-results are preferably also assigned a dirty flag, particularly where multiple sub-results need to have a sub-analytic run on them to generate another sub-result, or the result of the repeating analytic.

In step 440, the system partitions the repeated analytic into a plurality of sub-analytics. In some embodiments, the system references templates that automatically divide an analytic into a plurality of sub-analytics. In step 450, the system assigns each sub-analytic to a database partition to generate a sub-result. In some embodiments, the sub-results can be concatenated to one another to generate the result. In other embodiments, the sub-results may need another sub-analytic to be executed. In such embodiments, the system will assign the sub-analytics to the sub-result partitions in step 460.

FIG. 5 shows an exemplary method that could be used to update a partition as a function of a received database update. In step 510, the system receives the command to update the database. In step 520, the system determines which partition to update. This determination step is typically dependent upon the method used to partition the database structure. For example, where the database partitions were generated using a hash function based on database keys, the system could feed the database key for each entry that is being updated into the hash function. Where the database partitions were generated by dividing a sorted database into equal portions, the system could determine the database partition as a function of the sorted column value of the updated database entry. In alternative embodiments, instead of receiving the command to update the database, the system could update the database, receive the location of where the database was updated, and then correlate that location with the database partitions to determine which partition to update.

In step 530, the system then updates the partition that is to be updated, and in step 540, the system sets the dirty flag of the updated partition.

Figure 6:
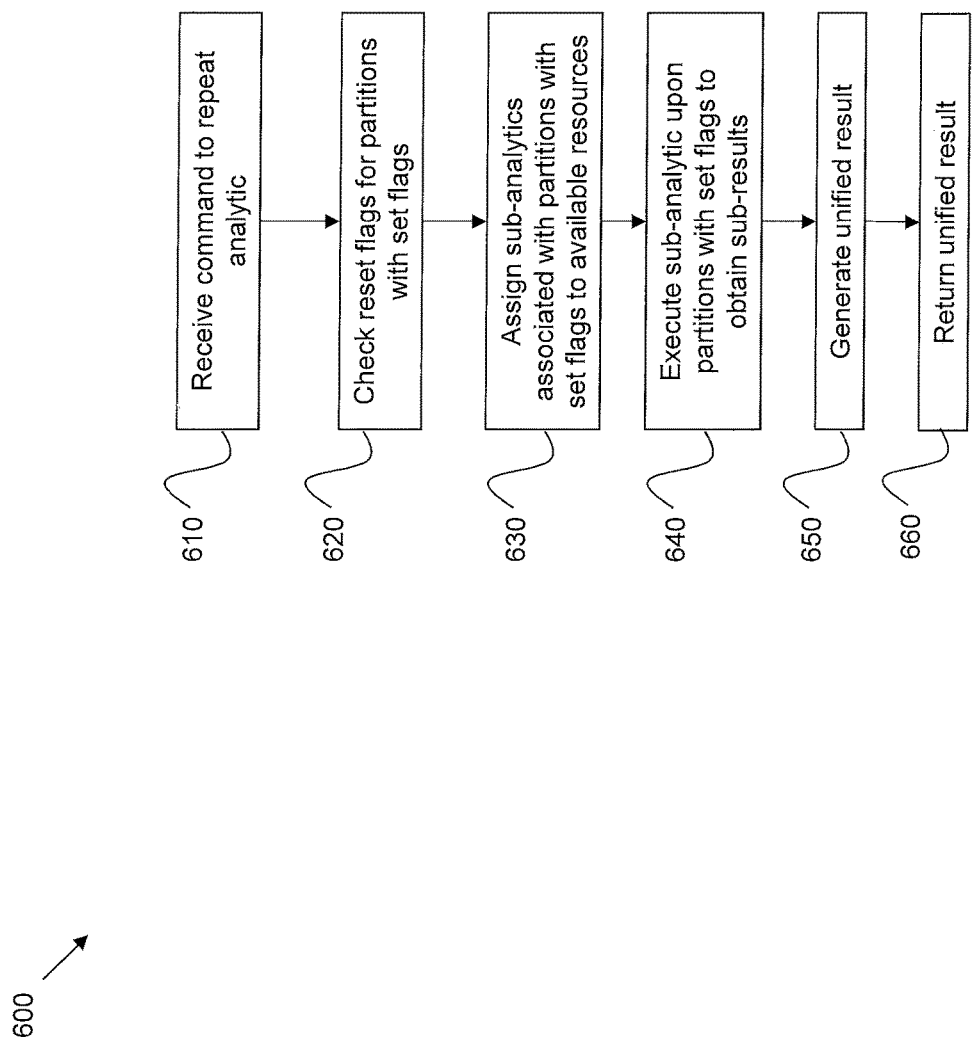
FIG. 6 shows a method of executing a repeating analytic.

FIG. 6 shows an exemplary method that could be used to execute the repeating analytic upon the database structure. In step 610 the system receives the command to repeat the analytic. In step 620, the system checks the reset flags for partitions that have set flags, representing partitions that have been updated since the analytic was last executed. Typically, the reset flags are stored in a table, such as a hash table. In step 630, the system assigns the sub-analytics associated with partitions with set flags to available resources. Preferably, the same hash table that stores the dirty flags also stores associations with sub-analytics. In embodiments where each partition is already assigned to a dedicated computer system, the system could simply send commands to each of the dedicated computer systems to execute the sub-analytic. Preferably, the system is distributed in a cloud computer environment that allows a plurality of processors to access common memory areas. In those embodiments, the system preferably assigns each sub-analytic to discrete processors.

In step 640, the system executes the sub-analytic upon processors with set flags to obtain sub-results. Step 640 may require sub-analytics to also be run on sub-results in a tiered structure, particularly for complex analytics. In step 650, the system generates a unified result from the sub-results, and returns the unified result to the calling process/thread in step 660.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-implemented method for repeatedly executing an analytic on a database structure, comprising:
   partitioning the database structure into a first database partition and a second database partition;
   assigning a first dirty flag to the first database partition and a second dirty flag to the second database partition;
   partitioning the analytic into a first sub-analytic and a second sub-analytic;
   executing the analytic at a first time by:
   (a) executing the first sub-analytic on the first database partition using a first thread to produce a first sub-result, and
   (b) executing the second sub-analytic on the second database partition using a second thread to produce a second sub-result;
   generating a first result using the first sub-result and the second sub-result;
   setting the first dirty flag when the first database partition is updated;
   setting the second dirty flag when the second database partition is updated;
   executing the analytic at a second time by:
   (a) identifying that the first dirty flag is set and the second dirty flag is not set, and
   (b) executing the first sub-analytic on the first database partition using a third thread to produce a third sub-result; and
   generating a second result using the third sub-result and the second sub-result;
   generating a flag table comprising a mapping of the first dirty flag to the first database partition and the second dirty flag to the second database partition.

2. The computer-implemented method of claim 1, wherein the analytic comprises a SORT database command.

3. The computer-implemented method of claim 2, wherein partitioning the database structure comprises assigning a first section of an alphabet to the first database partition and assigning a second section of the alphabet to the second database partition.

4. The computer-implemented method of claim 3, further comprising
   receiving a set of data to be inserted into the database structure;
   wherein the set of data comprises a first subset of data and a second subject of data;
   inserting the first subset of data into the first database partition and setting the first dirty flag when the first subset of data comprises data associated with the first section of the alphabet;
   inserting the second subset of data into the second database partition and setting the second dirty flag when the second subset of data comprises data associated with the second section of the alphabet.

5. The computer-implemented method of claim 1, wherein the analytic comprises at least one of a JOIN database command, an AGGREGATE database command, and a GROUP BY database command.

6. The computer-implemented method of claim 1, wherein partitioning the database structure comprises feeding the database structure into a hash function to divide the database structure into substantially even segments.

7. The computer-implemented method of claim 1, further comprising partitioning the database structure as a function of the analytic.

8. The computer-implemented method of claim 1, wherein generating the first result comprises writing the first sub-result to a first section of memory and the second sub-result to a second section of memory.

9. The computer-implemented method of claim 8, wherein generating the second result comprises writing the third sub-result to the first section of memory without writing any data to the second section of memory.

10. The computer-implemented method of claim 1, wherein the flag table comprises a hashmap.

11. The computer-implemented method of claim 1, wherein the flag table comprises a plurality of additional dirty flags, wherein each of the plurality of additional dirty flags are assigned to additional database partitions of the database structure.

12. The computer-implemented method of claim 11, wherein the flag table comprises a hashmap.

13. The computer-implemented method of claim 11, wherein the plurality of additional dirty flags comprises at least 100 additional dirty flags.

* * * * *